No. 723,401. PATENTED MAR. 24, 1903.
O. MOH.
FILM CAMERA.
APPLICATION FILED JUNE 13, 1901.
NO MODEL. 2 SHEETS—SHEET 1.
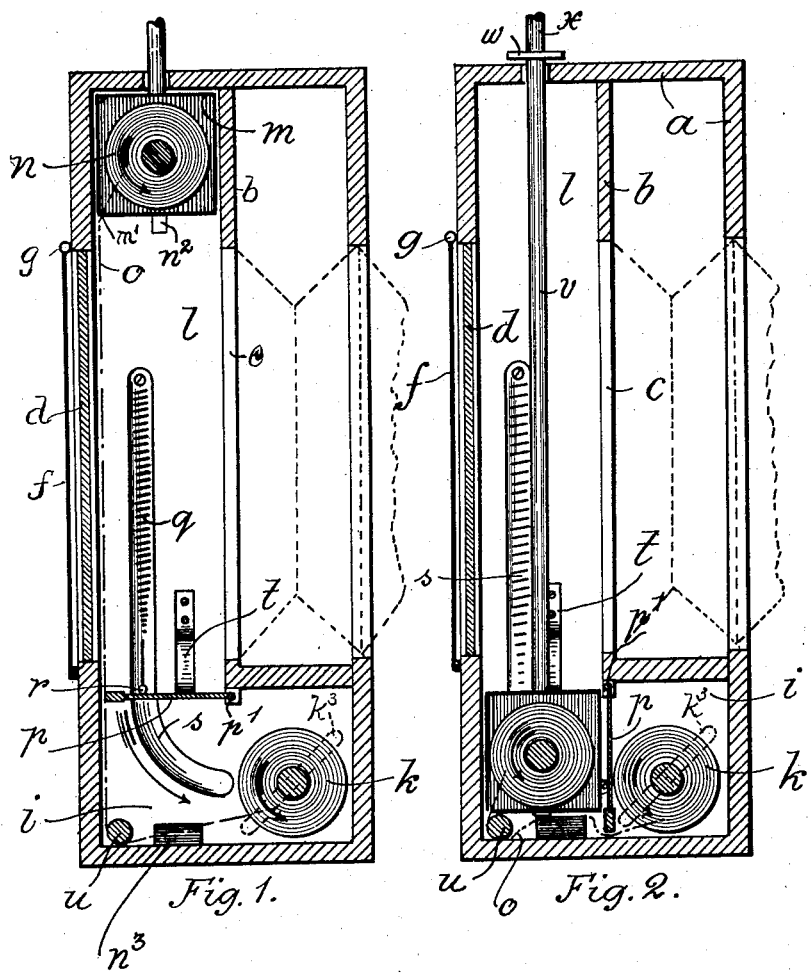
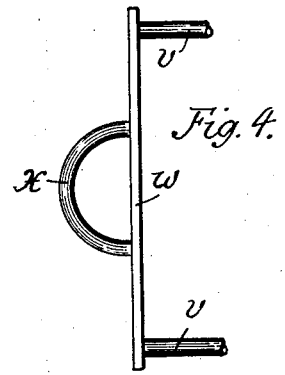
Fig. 4.
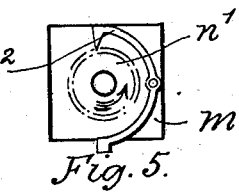
Fig. 5.
Witnesses:
Chemnitz H. Schilling
Otto Behr
Inventor:
Oswald Moh,
by Paul P. Schilling,
his attorney.

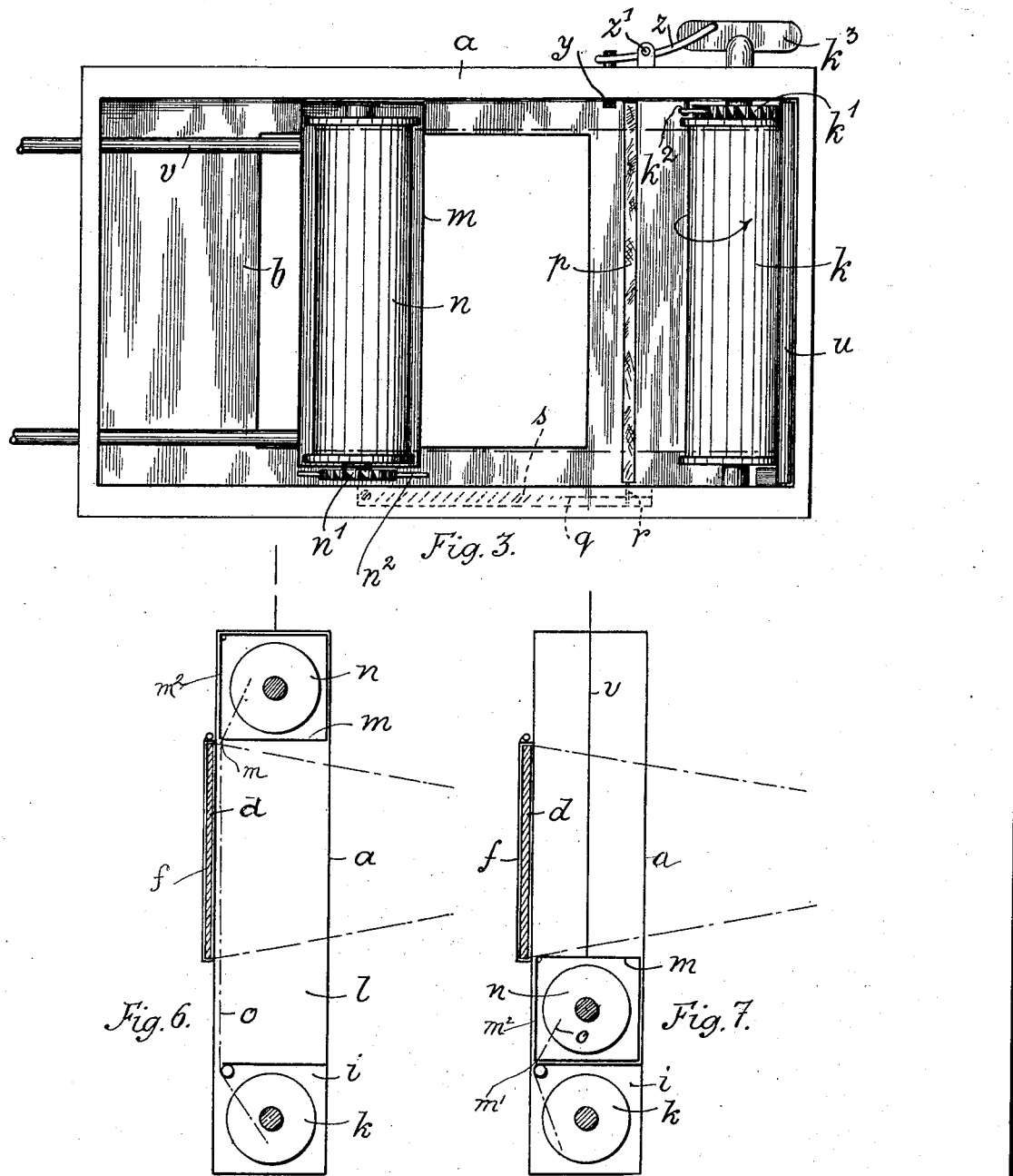

UNITED STATES PATENT OFFICE.

OSWALD MOH, OF GÖRLITZ, GERMANY.

FILM-CAMERA.

SPECIFICATION forming part of Letters Patent No. 723,401, dated March 24, 1903.

Application filed June 13, 1901. Serial No. 64,405. (No model.)

*To all whom it may concern:*

Be it known that I, OSWALD MOH, a subject of the Emperor of Germany, residing at Görlitz, Germany, have invented a certain new and useful Improvement in Film-Cameras, of which the following is a specification.

The present invention has reference to improvements in film-cameras, and relates more especially to means whereby a ground-glass plate for focusing the image of the object or scene to be photographed may be consulted before each section of the film is exposed.

As is well known, the greatest disadvantage of the film-camera now in use is that the image to be photographed cannot be focused upon a ground-glass plate before the exposure takes place, which results in the loss of a great number of the film-sections. This drawback is done away with through the present invention, which I will now describe with reference to the accompanying two sheets of drawings, in which—

Figure 1 is a cross-section through a folding camera, the parts being in the position ready for an exposure. Fig. 2 shows a cross-section through the camera, the various parts being in the position for focusing. Fig. 3 shows a rear view of the camera, the back wall of the camera-box and of the film-box being removed to facilitate inspection. Figs. 4 and 5 show detailed parts. Figs. 6 and 7 are diagrammatical sections through a modification.

Referring to the drawings, $a$ is the box or body of the camera, which latter may be a folding camera, box-camera, bellows camera, stereoscopic camera, or any other suitable type. The box $a$ is divided by means of a partition-wall $b$, to the opening $c$ of which are fitted the bellows, (shown in dotted lines in Figs. 1 and 2,) provided at the front end with the lens or system of lenses in the ordinary manner. The rear wall of the box is provided with an opening, in front of which is arranged the ground-glass plate $d$. The latter is ordinarily covered by a cover $f$, hinged at $g$ to the box $a$. In the compartment $i$ a film-roller $k$ is journaled, to the upper part of which is fastened the ratchet-wheel $k'$, influenced by the click $k^2$, pivoted to the box $a$. The axle of the film-roller $k$ is carried light-tightly through the wall of the box and carries the handle $k^3$. The roller $k$, therefore, can be turned only in the direction of the arrow. In the chamber $l$ is arranged a box $m$, adapted to travel from one end of the chamber to the other. Within this box is journaled the film-roller $n$. The film-box is provided with a slot $m'$ along one longitudinal edge, through which the film $o$ passes, and with a suitable end door for exchanging the film-rollers. The axle of this film-roller is carried through the lower wall of the film-box $m$ and carries a ratchet-wheel $n'$, adapted to be engaged by a gravity or weighted rocking pawl $n^2$ (shown separately in Fig. 5) or other suitable click device. To the partition-wall $b$ is hinged at $p'$ a trap-door $p$, adapted to turn at an angle of ninety degrees from the position shown in Fig. 2 to the position shown in Fig. 1. A helical spring $q$ is secured to one end to the wall of the camera-box and to the other end to a pin $r$, fastened on the trap-door, as shown in Fig. 3. The spring $q$ rests in a curved channel $s$, sunk into the wall of the camera-box. A leaf-spring $t$ prevents the trap-door from opening too far under the influence of the helical spring $q$. In the corner of the compartment $i$ is journaled a roller $u$ for guiding the film $o$. To the film-box $m$ are secured the rods $v$, which are carried through the wall of the camera-box and are connected by a cross-bar $w$ with handle $x$. (Shown separately in Fig. 4.) Near the trap-door is provided in the camera-box a spring-pin $y$, the lower end of which ordinarily projects into the path of the traveling film-box $m$, but which can be lifted by pressing down the free end of a double-armed lever $z$, pivoted at $z'$.

In operation the film-box being in the position shown by Fig. 1 is provided with the supply film-roller $n$, a strip of black paper forming the beginning of the film in the usual way. The film is carried over the guide-roller $u$ and fastened to the receiving-roller $k$. In this end position of the film-box $m$ the swinging pawl $n^2$, pressed against the top wall of the camera-box, engages the toothed wheel $n'$, and thereby prevents the supply-roller from rotating. By turning the receiving-roller $k$ in the direction of the arrow the film $o$ is wound upon the roller $k$ and the film-box $m$ is drawn across the camera-box toward the roller $k$ until it comes in contact with the spring-pin $y$. This pin is now lifted by actuating the lever $z$, the handle $x$ is grasped, and the film-box $m$ is pushed home into the position shown in Fig. 2. The trap-door $p$ is now turned down in front of the receiving-film-roller, the slack of the film caused by the sudden pushing in of the film-box without the roller $k$ being rotated being taken up by the compartment $i$. The cover $f$ may now be opened, so as to expose the ground-glass plate, and the image of the scene or object to be photographed may now be focused in the ordinary manner. After having focused, the cover $f$ is placed over the ground-glass plate, the spring-pin $y$ is actuated so as to permit the film-box to pass by into the other end position. (Shown in Fig. 1.) The pawl $n^2$, having been previously actuated by having its lower end pressed against the stop $n^3$, has released the toothed wheel $n'$, so that the supply-roller upon being drawn back into the position shown in Fig. 1 is able to rotate and allow the film $o$ to be unwound and stretched across the back of the camera in front of the ground-glass plate, the roller $k$ being prevented from rotating by its ratchet device. The trap-door returns into its position of rest, Figs. 1 and 3, and prevents the film wound upon the roller $k$ from being affected by light-rays. The camera is now ready for exposure.

In the modification shown in Figs. 6 and 7 the compartment $i$ is arranged in line with the chamber $l$ for the traveling film-box. The trap-door, with its accessories, is replaced by a stationary partition-wall. The spring-pin for stopping the traveling film-box is also done away with, the film-box being pushed right up to the stationary partition-wall; otherwise the parts are approximately the same as those explained with reference to Figs. 1 to 5.

What I claim, and desire to secure by Letters Patent, is—

1. A film-camera comprising a box, a slideway leading from said box inside of and across the ground glass, a film-receiving roller journaled in fixed bearings in the box, a dark box slidable in the box and slideway, a film-supply roller journaled in the dark box, a trap-door hinged at the junction of the box and slideway, means for holding the door in position to close the slideway when the dark box is in it, and means for moving the door to inclose that part of the camera-box which incloses the film-receiving roller when the dark box is slid out of the slideway into the camera-box, substantially as described.

2. A film-camera comprising a film-receiving roller, a slidable dark box, a film-supply roller journaled in the dark box, a ratchet-wheel on the supply-roller, a curved pawl encompassing one-half said wheel, pivoted at its center and weighted at its lower end, said pawl normally held by said weighted end in engagement with the ratchet-wheel and locked therein at the end of the outward movement of the dark box by contact with the top of the camera, and a stop to engage the weighted end of the pawl at the opposite end of the movement of the dark box and release it from the ratchet-wheel substantially as described.

3. In a film-camera, the combination of a ground-glass plate, arranged in the back wall of the camera, a cover hinged to the camera-box and adapted to cover the said ground-glass plate, a stationary receiving film-roller journaled light-tightly within a compartment of the camera-box, means for rotating the said receiving film-roller from without in the one direction and for securing it against rotation in the other direction, a light-tight box adapted to travel from one side of the camera to the other, means for moving the said traveling box to and fro, a supply film-roller journaled within the said traveling film-box, means for alternately preventing and allowing rotation of the said supply film-roller, means for guiding the film parallel to and closely in front of the said ground-glass plate, a trap-door, a helical spring lying in a channel provided in the wall of the camera-box, and adapted to ordinarily retain the said trap-door in a position rectangularly to the path of the said traveling film-box, and means for preventing the said trap-door from opening too far, the parts being constructed, arranged and working substantially as and for the purpose set forth.

In witness whereof I have hereunto set my hand, in the presence of two witnesses, at Zittau, May 8, 1901.

OSWALD MOH. [L. S.]

Witnesses:
OTTO THIOMANN,
CHEMMITZ H. SCHILLING.